Figure 1:
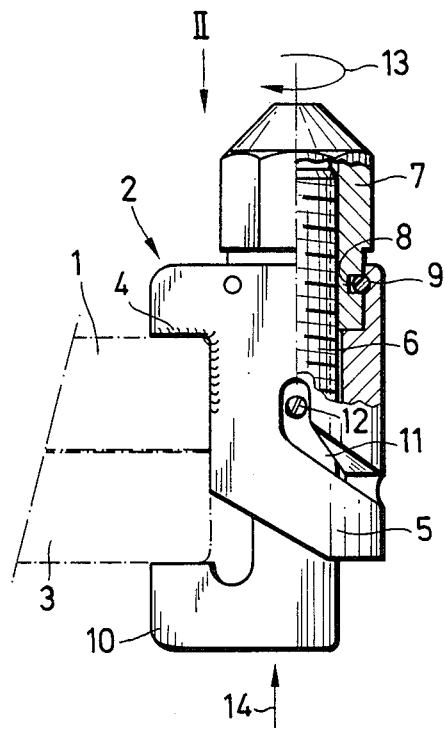

United States Patent [19]  
Gerlach et al.

[11] Patent Number: 4,871,278  
[45] Date of Patent: Oct. 3, 1989

[54] BOLT-OPERATED CLAMPING DEVICE

[75] Inventors: Wolfgang Gerlach, Castrop-Rauxel; Reimund Malczok, Dortmund, both of Fed. Rep. of Germany

[73] Assignee: Uhde GmbH, Dortmund, Fed. Rep. of Germany

[21] Appl. No.: 199,134

[22] Filed: May 26, 1988

[30] Foreign Application Priority Data

May 27, 1987 [DE] Fed. Rep. of Germany ....... 3717978

[51] Int. Cl.$^4$ ............................................. F16D 1/00
[52] U.S. Cl. .................................. 403/338; 403/348; 24/525; 292/64
[58] Field of Search ...................... 403/348, 349, 338; 24/525, 526; 292/64, 65

[56] References Cited

U.S. PATENT DOCUMENTS 2,896,978  7/1959  Schumacher ................. 403/338 X  
4,583,775  4/1986  Bisbing ......................... 292/64

FOREIGN PATENT DOCUMENTS 987314  3/1965  United Kingdom ................. 24/525

Primary Examiner—Andrew V. Kundrat  
Attorney, Agent, or Firm—Toren, McGeady & Associates

[57] ABSTRACT

The invention relates to a device for clamping and unclamping of components with the aid of a clamping flange, at least one of said components being clamped by the hook of said device, the clamping force being transferred via a bolt linked with the hook and a nut that can be operated from the external side. The invention provides for a device clamped and unclamped by means of a tool such as an impact wrench, the head of which need not be tilted, lifted or lowered.

The aim of the invention is achieved by means of nut (5) that is arranged in a fixture and that can be turned but yet remains in a defined position, and by means of hook (10) that is linked with bolt (6) and guided with the aid of element (12) in groove (11) of fixture (5), the hook thus performing upward and downward motions and being swivelled by at least 45° around its longitudinal axis for unclamping the flange.

3 Claims, 1 Drawing Sheet

U.S. Patent    Oct. 3, 1989    4,871,278

4,871,278

BOLT-OPERATED CLAMPING DEVICE

The invention relates to a device for clamping and unclamping a cover of a vessel or similar components with the aid of clamping flanges, at least one of said components being clamped by the hook of said device, the clamping force being transferred via a bolt linked with the hook and a nut that can be operated from the external side, said device being of a captive type and attached to one of the components.

Such bolt-operated clamping segments are known and described in an advertising pamphlet of Messrs Walter G. Rathenau/Koblenz, page 127, edition 1985. In this case, two segments linked by means of a bolt and performing a tong-type movement clamp the flange ring of the vessel and cover, respectively. Turning the nut locks the two hook segments and, hence, the flange rings are clamped. The bolt moves into an inclined position through an oblong opening when being lowered for unclamping the flange.

An essential disadvantage of this design is that the bolt moves from the vertical into an inclined position. This means that the tool for manipulating the device also has to perform this movement in order to turn the nut if said tool operates from above.

In various fields of application, the above-mentioned design is inadequate, i.e. it is imperative that the manipulating tool be always in a fixed position and that no components be captive during clamping and unclamping.

The aim of the invention is to design a device permitting the use of a manipulating tool, such as an impact wrench, for clamping and unclamping the head of said tool not performing a tilting, upward or downward movement, the device forming a compact unit of captive members.

The invention provides for a nut that can be turned but remains in a defined position and for a hook that is linked with a guide member by means of a bolt, said guide member moving in a guide groove of the fixture, i.e. the hook can move upwards and downwards and swivel by at least 45° around its longitudinal axis to unclamp the flange assembly.

The invention thus permits the use of a tool such as an impact wrench for turning the nut, thus lowering the bolt for unclamping the device but said nut remaining in its position. When the hook is lowered for unclamping the device, the guide groove makes the hook move around the longitudinal axis of the bolt as well as of the nut and the manipulating tool and, consequently, the axis need not be offset. The hook performs a swivelling motion when unclamping the cover of the vessel etc. The clamping operation takes place the other way round, i.e. when turning the nut the hook moves upwards, swivels into the required position and clamps the flange ring of the component concerned.

An embodiment provides for the following configuration: The fixture has a curved guide groove and a bolt-hook assembly with a pin guided in said groove, the guiding mechanism of oblong hole and pin being known already and corresponding to the state of the art in mechanical engineering. In this case, said guide assembly is also of a simple design using a guide groove but the invention is by no means limited to the pin/-groove assembly.

It may be useful to provide for a hook that can be swivelled by approx. 90° around the axis of bolt/nut with the aid of the guide groove and pin, thus making sure that the hook can be moved easily out of the clamping position of the flange ring. It is of course possible to provide for a larger angle in order to meet design requirements.

A special feature of the invention is that the nut can be turned but yet remains in a defined position, using a guide groove and pins for fixing it.

It should be noted that the fixture accommodating all elements (i.e. for the nut and for the hook, including the guide pin) may be welded to the upper flange ring to facilitate the manipulation of the nut for lowering the clamping hook. Other methods may also be used, e.g. tong-and-groove guiding, dovetail guiding, etc.

The figures attached and indicated below serve to illustrate the design of this embodiment.

FIG. 1: Cross-sectional view of the clamped device

Figure 2:
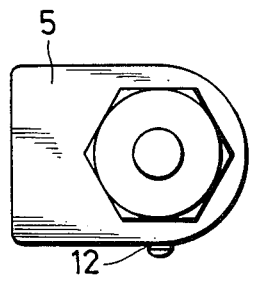

FIG. 2: Plan view according to arrow II in FIG. 1

Figure 3:
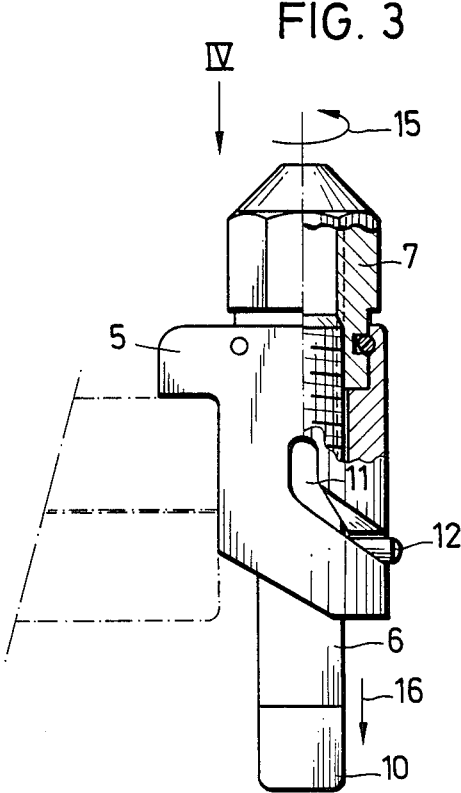

FIG. 3: Cross-sectional view of the unclamped device.

Figure 4:
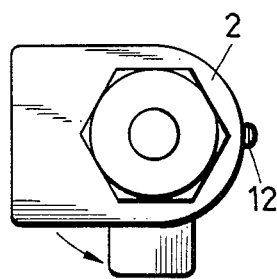

FIG. 4: Plan view according to arrow IV in FIG. 3.

Device 2 is attached to flange 1 (dash-dotted) and serves for clamping said flange to the second flange 3, the device being for instance welded to flange 1 (the weld is marked 4). Flange 3 may for instance be the flange ring of a vessel and flange 1 part of the cover or the flanges may be part of piping components but this is not an essential feature of the application.

Device 2 consists mainly of fixture 5 accommodating bolt 6 and nut 7. Bolt 6 is guided in the fixture and moved with the aid of nut 7.

In order to fix the position of nut 7, it has a groove 8 for locking pins 9 in the fixture. Retaining rings for equivalent items are also suitable in this respect.

The protruding end of bolt 6 is linked with hook 10 clamped to flange 3 as shown in FIG. 1.

In order to unlock hook 10 linked with bolt 6 and to move it out of the position shown in FIG. 1, thus releasing flange 3, fixture 5 is equipped with guide groove 11 and bolt 6 with pin 12.

Moving nut 7 in the direction of arrow 13 in FIG. 1 clamps hook 10 to the lower side of flange 3, said position being marked 14 in FIG. 1. When turning nut 7 in the opposite direction (arrow 15 in FIG. 3) bolt 6 moves downwards (arrow 16), pin 12 moving in the guide groove 11, so that hook 10 becomes disengaged.

It is of course possible to modify the embodiment described above but yet to maintain the design principle. For instance, a curved groove-tong assembly may be provided in the device instead of guide groove 11 with related pin 12 or bolt 6 may have an internal guide neck, etc. Moreover, a spring-loaded mechanism acting in the direction of arrow 16 may be installed and is particularly suitable in cases where the device has to be arranged in a horizontal or even overhead position which requires that hook 10 be moved upwards for unlocking the device.

We claim:

1. A device for clamping and unclamping a cover of a vessel by way of a cover flange and a vessel flange, comprising:

a hook provided so as to be clampable on one of the flanges;

a bolt extending from said hook so as to transfer a clamping force;

an externally operable, turnable nut provided on said bolt;

a fixture for holding said nut so that said nut remains in a defined position therein, said fixture being attached to one of the flanges; and means on the fixture for guiding said hook extending from said bolt so that said hook can move up and down and swivel at least 45° about its longitudinal axis so as to unclamp the flanges.

2. A device according to claim 1, wherein said guiding means includes a curved guide groove in said fixture, and a pin provided on said bolt and hook so as to be guidable in said groove.

3. A device according to claim 2, wherein said hook is provided so as to be swivelable approximately 90° about the axis of said nut by way of said guide pin and said guide groove.

* * * * *